United States Patent [19]
Vithayathil

[11] Patent Number: 6,051,953
[45] Date of Patent: Apr. 18, 2000

[54] BRUSHLESS EXCITERLESS FIELD SYSTEM FOR AC SYNCHRONOUS MACHINES

[76] Inventor: Joseph Vithayathil, 33, Neal Cove, Bryant, Ark. 72022

[21] Appl. No.: 09/122,005

[22] Filed: Jul. 24, 1998

[51] Int. Cl.[7] .................................................. H02P 1/26
[52] U.S. Cl. ..................... 318/818; 318/700; 318/785; 318/794; 318/781
[58] Field of Search .................................. 318/818, 700, 318/785, 794, 781

[56] References Cited

U.S. PATENT DOCUMENTS

| 5,012,148 | 4/1991 | Vithayathil | 318/818 |
| 5,808,441 | 9/1998 | Nehring | 318/751 |
| 5,844,343 | 12/1998 | Horst | 318/818 |

*Primary Examiner*—Karen Masih

[57] ABSTRACT

A three phase AC motor which rotates at the synchronous speed determined by the number of poles of its main stator winding and the frequency of the AC input to it, which does not need any exciter machine or brushes to provide its DC field current, but has an internal, but independently adjustable excitation system to supply its field current. The internal excitation system consists of an auxiliary winding on the stator which is additional to the main power winding, another auxiliary winding on the rotor besides the main DC field winding, a diode rectifier circuit on the rotor from which the DC field current is supplied by rectification of the induced currents in the rotor auxiliary field. The field current adjustment can be made by adjustment of the input to the stator auxiliary winding. This can be done independently by eliminating any magnetic coupling between the main and auxiliary circuits. The elimination of the magnetic coupling between the main and auxiliary circuits is achieved by winding the auxiliary circuits for a suitably chosen pole number which is different from that of the main circuits. An optional damper winding will assist in starting when the machine is operated from a fixed frequency supply and ensure stability during steady state rotation. The machine is suitable for inverter fed adjustable speed drives and for fixed frequency operation. It can function in the motoring and the generating modes.

7 Claims, 2 Drawing Sheets

BRUSHLESS EXCITERLESS FIELD SYSTEM FOR AC SYNCHRONOUS MACHINES

BACKGROUND OF THE INVENTION

This invention relates to AC electric motors and generators of the synchronous type, specifically to the incorporation of the excitation system internally in the machine itself, eliminating the need for brushes and a separate exciter.

A synchronous type of AC machine, whether it be a motor or a generator, has fixed magnetic poles on its rotor. These poles are typically excited by providing a DC current, called the field current or the exciting current, through the field windings which are located on the rotor. There are also synchronous machines constructed with permanent magnets on the rotor. These machines do not need field current and the field flux has a fixed magnitude which is not easily adjustable. This invention does not include such machines, but is applicable only to machines which are excited by a DC field current.

The arrangement for providing the DC exciting current is called the excitation system. Typically the source of DC is another machine called the exciter, which is coupled to the synchronous machine and rotates with it. Earlier exciters were DC generators. Such machine plus exciter systems needed several brushes because the DC exciter also had to have brushes on its commutator. Later, totally brushless excitation systems became popular, which used an AC generator as the exciter. In such exciters the windings where AC is generated are located on the rotor. The generated AC is converted to DC by a diode rectifier circuit mounted on the rotor and fed directly to the field of the synchronous machine, thereby totally eliminating the need for any brushes or sliding contacts. The adjustment of the field current is made by adjustment of the field current of the exciter machine, whether it is an AC exciter or a DC exciter. Since the field of the exciter machine is on its stationary side in both types of exciters, the field current adjustment can be done from the stationary frame in both cases.

BRIEF SUMMARY OF THE INVENTION

In contrast to the above described schemes, the present invention, besides being a brushless scheme, totally eliminates the need for a separate exciter machine. The new scheme also enables the adjustment of the field current, and therefore the power factor of the synchronous machine, from the stationary frame. Basically it is an incorporation of the excitation system in the main synchronous machine itself in such a way that independent control of the field current is possible.

An earlier patent granted to me (U.S. Pat. No. 5,012,148 of Apr. 30, 1991) also describes a brushless scheme for providing the DC field current of a synchronous machine without the use of brushes or an exciter machine. The new scheme has the following definite advantages over the earlier described schemes.

The technique for providing the DC field current in the present invention is different from all the three described in the earlier patent referred to above (U.S. Pat. No. 5,012,148 of Apr. 30, 1991) and has the following advantages over those.

(i) The power supply to the motor does not need to have more than one frequency component. Therefore, the motor can operate from the standard utility three phase supply, which is essentially a single frequency supply. For adjustable speed applications the motor may be used with an adjustable frequency inverter. But such an inverter does not have to provide a combination of frequencies in its output.

(i) There is no unbalance in the stator circuit of the motor and it does not need any unbalance in the power supply. Therefore, since the standard utility power supply and conventional inverter outputs are essentially balanced ones, the motor can operate from all such power supplies.

(iii) Normally, in three phase AC motors of the induction and synchronous types, the stator phase windings are designed in such a way as to minimize spatial harmonics in the mmf distribution. This statement is also applicable to the new invention. No special steps are necessary, as regards the spatial mmf distribution of the stator windings in this invention, different from the conventional machines. This is because spatial harmonics in the mmf distribution of the phase windings are not necessary to create the auxiliary rotating field responsible for the creation of the DC field current.

The field current adjustment is totally independent of the main power circuit and is decoupled from it. This makes it easy to implement automatic closed loop adjustment of the field current and thereby the power factor, during the operation of the motor. This also makes it easier to implement vector control for achieving fast dynamic response in adjustable speed drive systems.

Further objects and advantages are that the motor works on the induction principle and can be used for applications where an induction motor is usable, but with a considerably better power factor, and without any slip. Further it is usable as a synchronous motor or as an alternator without the need for a separate exciter. It can be used as a "brushless DC motor" in combination with a power inverter and appropriate timing circuit for commutation. Still further objects and advantages will become apparent from a consideration of the ensuing description and drawings.

BRIEF DESCRIPTION OF THE DRAWINGS

In FIG. 1, the circuit blocks shown above the broken line are located on the stator on the machine. The circuit blocks shown below the broken line are located on the rotor of the machine.

REFERENCE NUMERALS IN DRAWINGS

Figure 1:
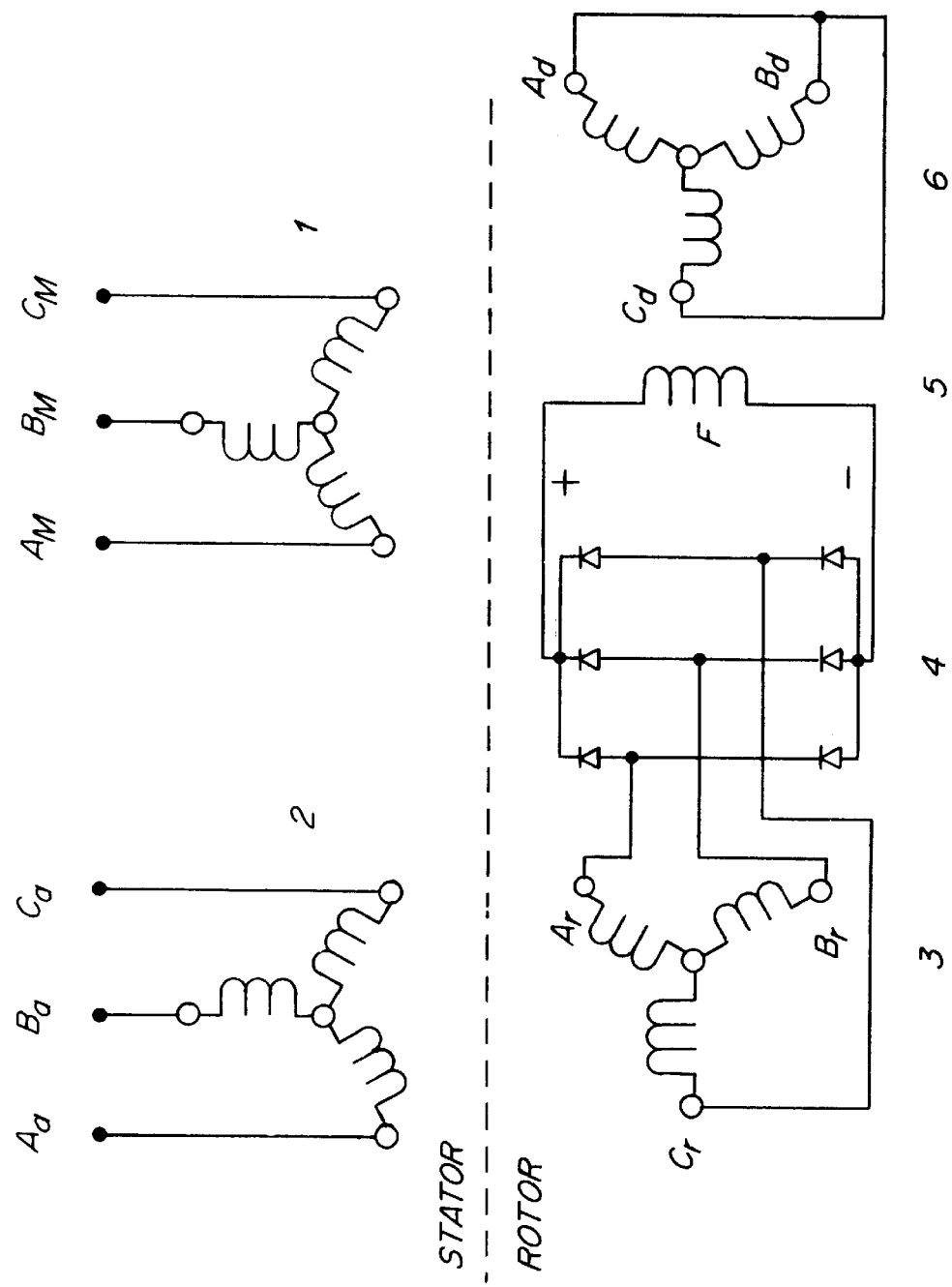
FIG. 1 shows the electrical circuits in an implementation of the invention. In this figure the individual circuit blocks are identified by the numerical digit adjacent to each.

1. Main three phase stator winding
2. Auxiliary stator winding
3. Auxiliary rotor winding
4. Diode bridge rectifier
5. DC field winding
6. Damper winding
7. Field current regulating elements

DETAILED DESCRIPTION OF THE INVENTION

In accordance with the present invention the synchronous machine consists of a three phase main winding and a three phase auxiliary winding, both being on the stator, an auxiliary winding on the rotor, a diode bridge rectifier on the rotor, the DC field winding on the rotor and an optional short circuited damper winding on the rotor.

A typical embodiment of the synchronous machine of the present invention is illustrated in FIG. 1. The machine has the main three phase winding 1 on the stator which is shown Y connected in the figure. Alternatively it may also be delta connected. The stator additionally has another winding 2 designated as the auxiliary winding which is shown Y connected, but may alternatively be delta connected. Although both the main and the auxiliary windings are housed on the stator, the magnetic coupling between the two sets of windings is completely eliminated. This elimination of magnetic coupling is achieved by the appropriate choice of the pole numbers of these two sets of windings. In the machines that were built and tested to confirm the validity of this invention the pole number for the main winding was 4 and the pole number for the auxiliary winding was 2. For convenience we will use these pole numbers in the present description. But any combination of pole numbers which eliminates the magnetic coupling between the two sets of windings can be used in this invention. With the above stated choice of pole numbers, the zone of one pole, say a north pole of the two pole winding spans the combined zone of two poles (one north and one south) in the four pole structure. Therefore the resultant magnetic flux due to the four pole structure linking with the two pole coils will be zero. Conversely the resultant flux from the two pole structure linking with the four pole structure is also zero. Thus the main and auxiliary windings, although they use the same magnetic structure, ideally have zero magnetic coupling between them.

The machine has on its rotor another auxiliary winding 3 which is wound for the same number of poles as the auxiliary winding on the stator, that is 2 poles, in our illustrative description. For the reasons explained before, this winding will be magnetically coupled only to the auxiliary winding on the stator and not to any other winding, irrespective of whether the rotor is stationary or in relative motion to the stator. The auxiliary stator winding is the only winding that can induce emf's in this rotor auxiliary winding because it is the only circuit to which it has magnetic coupling.

The rotor also carries a diode rectifier 4 which converts the AC induced in the rotor auxiliary circuit into DC. This DC serves as the field current of the synchronous machine and is fed to the main field winding 5. The main field winding 5 is wound for the same number of poles as the main stator winding. Also shown in FIG. 1 is the winding 6 which we will designate as the damper winding. This winding is short circuited on itself and serves as an induction starting circuit in the motoring mode and as a damper winding ensuring stability of rotation during synchronous running. It is optional and may not be provided when not required. In the figure it is shown as a three phase winding. Alternatively it may consist of short circuited coils with a coil pitch corresponding to the main winding, with or without interconnection between the coils. Therefore it will be inactive during rotation at the synchronous speed of the main winding.

The DC field current is provided by the rectified output from the rotor auxiliary winding. The voltage induced in the rotor auxiliary winding is solely due to the currents in the stator auxiliary winding because it is the only winding to which it is magnetically coupled. Therefore the adjustment of the DC field current can be done independently by adjustment of the input to the stator auxiliary winding.

Figure 2:
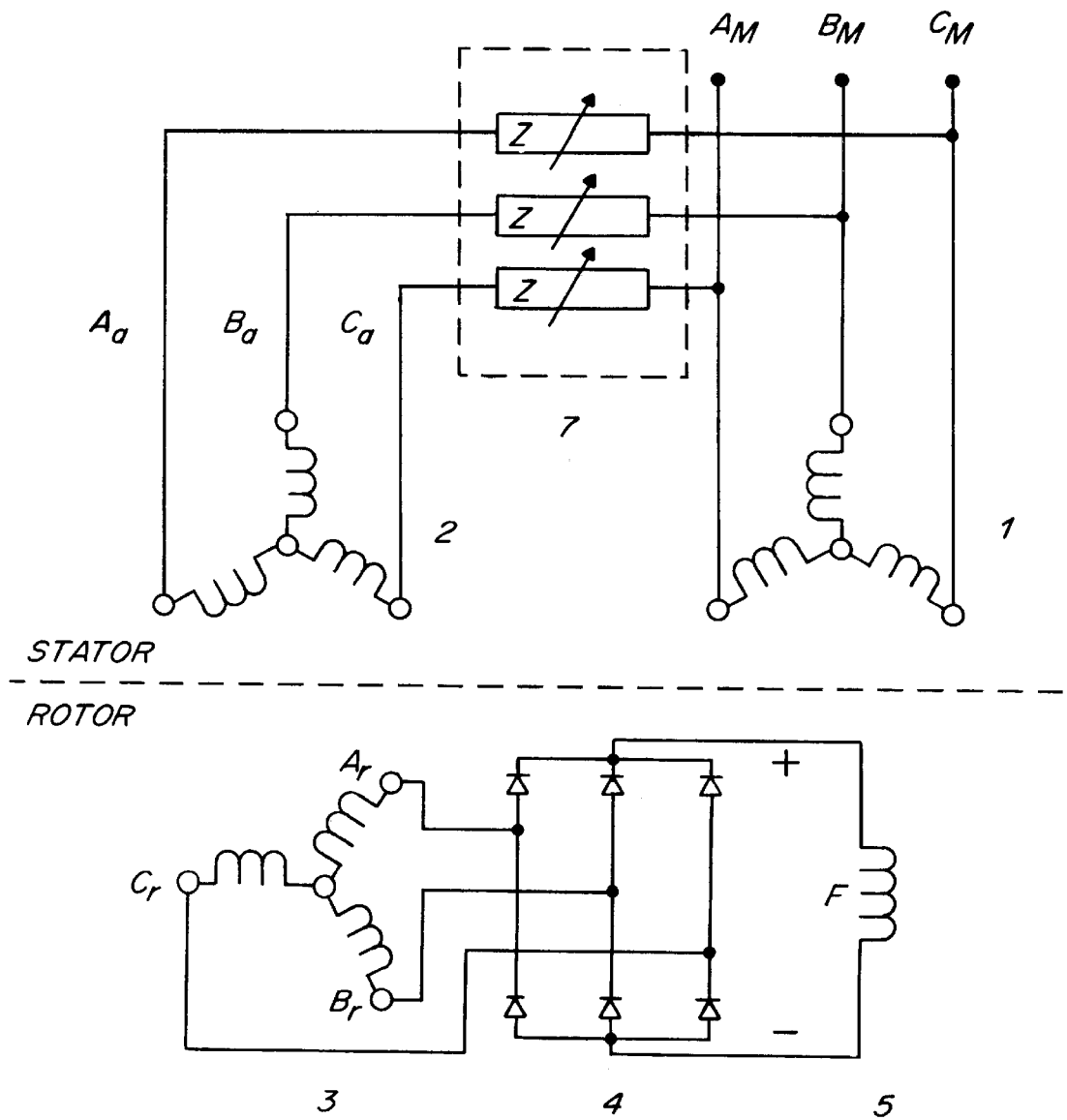
FIG. 2 shows a regulator in the auxiliary circuit, which may be used for adjusting the DC field current. The main circuit terminals and the terminals of the auxiliary circuit with the regulating element in series are connected to the same set of power terminals. These power terminals serve as the input terminals of the machine for motor operation and the output terminals of the machine for the generator mode of operation.

FIG. 2 shows one way in which this adjustment may be done when the machine is typically working from a utility three phase power bus. A three phase adjustable circuit labeled 7 in FIG. 2 consisting of elements labeled Z is inserted in series with the input to the auxiliary stator circuit. This serves to adjust the input into the auxiliary stator circuit and thereby the induced voltage in the auxiliary rotor circuit which is the source for the DC field current in the rotor. For manual adjustment the adjustable circuit 7 may be a variable ratio transformer, or a three phase adjustable impedance. Alternatively the adjustment may be done electronically. For this the circuit block 7 may consist of three triacs or bi-directional thyristor pairs. In this the firing delay angle (phase control) may be the means of adjustment of the field current. Alternatively solid state AC switches may be used, configured from suitable semiconductor power devices such as power Mosfets, or bipolar power transistors or IGBT's or GTO's. Control can be implemented by the pulse width modulated switching of these switches. In this case adjustment of the switching duty cycle (pulse width modulation), may be the means of adjustment of the field current.

The machine may be operated either from a fixed frequency bus such as the fixed frequency power utility three phase bus, or an adjustable frequency inverter such as in an adjustable speed drive system. When the main stator winding is energized from a three phase supply it creates a rotating field rotating at the synchronous speed determined by the input AC frequency and the pole number of the main winding. Since the damper winding is designed for the same pole number it functions like the rotor of an induction motor and helps to accelerate the rotor to near synchronous speed. When the speed is close to the synchronous speed the fixed magnetic poles of the main rotor winding lock with the rotating field and the rotor is drawn into synchronism with it. The rotor pulls into synchronous speed and after this its slip with respect to the main rotating field becomes zero and the damper windings become inactive and remains so during subsequent steady state operation. If the stator main field is being supplied from an adjustable frequency inverter, the initial frequency at starting is always very low. Therefore the DC excited fixed poles of the rotor can lock into synchronism with the main rotating field of the stator from the beginning itself. In this case the synchronization is achieved without the involvement of the damper winding The adjustment of the DC field current can be achieved by any of the methods mentioned earlier. Since the operating power factor is dependent on the field current, any of these methods can be used as a means of adjusting the power factor. It is also possible to use a separate AC source for the auxiliary winding—separate from the main source. In such a case the adjustment of the field current can be implemented by the adjustment of the auxiliary source itself including its frequency.

I claim:

1. A three phase AC motor which rotates at the synchronous speed corresponding to the frequency of the AC input to its main stator winding and the number of poles of this winding, by using an internal excitation system for providing an adjustable DC field current without the need for brushes and separate exciter machine: said excitation system comprising: (1) an auxiliary winding on the stator, this auxiliary winding being wound for a different number of poles from the main winding; (2) another auxiliary winding on the rotor wound for the same number of poles as the auxiliary winding on the stator, in which AC voltages are induced according to the input to the stator auxiliary winding and the speed of rotation; (3) a diode rectifier which converts the AC from the rotor auxiliary winding into DC; and (4) a main DC field winding on the rotor, wound for the same number of poles as the main stator winding, which receives the DC excitation from the said diode rectifier: wherein the number of poles of the main and auxiliary circuits of the stator and rotor are chosen in such way as to eliminate magnetic coupling between the main and auxiliary windings.

2. A three phase AC motor in accordance with claim 1 in which the auxiliary stator circuit may be supplied from the same AC source as the main circuit or from a separate AC source.

3. A three phase AC motor in accordance with claim 1, in which the DC field current can be independently adjusted by inserting adjustable elements in the input to the stator auxiliary winding to vary the input parameters of this circuit.

4. A three phase AC motor in accordance with claim 1, which has a short-circuited damper winding on the rotor, consisting of short-circuited coils with the winding pitch corresponding to that of the main winding, so as to assist in the starting of the motor and to serve as a damper winding.

5. A three phase AC motor in accordance with claim 1 in which the automatic adjustment of the field current for the adjustment of the power factor and other operational parameters relating to static and dynamic operation of the drive system can be implemented by an appropriate closed loop control scheme.

6. A three phase AC machine in accordance with claim 1 in which the motoring and generating modes of operation are possible.

7. A three phase AC motor in accordance with claim 1 for fixed speed operation from a fixed frequency supply and variable speed operation from an adjustable frequency inverter.

* * * * *